US010951846B2

(12) United States Patent
Shin

(10) Patent No.: US 10,951,846 B2
(45) Date of Patent: Mar. 16, 2021

(54) IMAGE SENSING DEVICE COMPRISING DUMMY PIXEL ROW AND ACTIVE PIXEL ROWS COUPLED TO READ-OUT COLUMN LINE, AND USING A HIGH SPEED ACTIVE PIXEL ROW READ-OUT METHOD THAT REDUCES SETTLING TIME BY PRECHARGING THE COLUMN LINE DURING A DUMMY PIXEL ROW SELECTION TIME BETWEEN ACTIVE PIXEL ROW SELECTION TIMES

(71) Applicant: SK hynix Inc., Gyeonggi-do (KR)

(72) Inventor: Min-Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 572 days.

(21) Appl. No.: 14/921,092

(22) Filed: Oct. 23, 2015

(65) Prior Publication Data
US 2016/0366357 A1 Dec. 15, 2016

(30) Foreign Application Priority Data
Jun. 9, 2015 (KR) ........................ 10-2015-0081057

(51) Int. Cl.
*H04N 5/378* (2011.01)
*H04N 5/369* (2011.01)
*H04N 5/374* (2011.01)
*H04N 5/3745* (2011.01)
*H04N 5/335* (2011.01)

(52) U.S. Cl.
CPC ............ *H04N 5/378* (2013.01); *H04N 5/335* (2013.01); *H04N 5/36963* (2018.08); *H04N 5/374* (2013.01); *H04N 5/3745* (2013.01)

(58) Field of Classification Search
CPC .... H04N 5/378; H04N 5/3745; H04N 5/3696; H04N 5/36963; H04N 5/335; H04N 5/372; H04N 5/374; H04N 5/376; H01L 27/146
See application file for complete search history.

(56) References Cited

U.S. PATENT DOCUMENTS

| 6,140,630 | A | * | 10/2000 | Rhodes | H01L 27/14609 250/208.1 |
| 9,972,656 | B2 | * | 5/2018 | Cieslinski | H01L 27/148 |
| 2002/0001038 | A1 | * | 1/2002 | Lee | H04N 5/3575 348/308 |
| 2008/0018762 | A1 | * | 1/2008 | Li | H04N 5/3575 348/308 |
| 2010/0091160 | A1 | * | 4/2010 | Murakami | H04N 5/378 348/301 |
| 2010/0271517 | A1 | * | 10/2010 | De Wit | H04N 5/378 348/294 |
| 2011/0013050 | A1 | * | 1/2011 | Aruga | H04N 5/378 348/241 |

(Continued)

FOREIGN PATENT DOCUMENTS

KR 1020120000267 1/2012

*Primary Examiner* — Twyler L Haskins
*Assistant Examiner* — Akshay Trehan
(74) *Attorney, Agent, or Firm* — IP & T Group LLP

(57) ABSTRACT

An image sensing device includes a pixel suitable for outputting a pixel signal through a read-out line during a read-out section and a precharge block suitable for precharging the read-out line to a voltage level corresponding to an initial voltage level of the pixel signal during a row non-selection section adjacent to the read-out section.

2 Claims, 6 Drawing Sheets

(56) References Cited

U.S. PATENT DOCUMENTS

| | | | |
|---|---|---|---|
| 2011/0267522 A1* | 11/2011 | Gendai | H04N 5/335 |
| | | | 348/308 |
| 2011/0315853 A1* | 12/2011 | Cho | H01L 27/14605 |
| | | | 250/208.1 |
| 2012/0062776 A1* | 3/2012 | Egawa | H04N 5/378 |
| | | | 348/302 |
| 2013/0119235 A1* | 5/2013 | Iida | H04N 5/3575 |
| | | | 250/208.1 |
| 2014/0022427 A1* | 1/2014 | Goto | H04N 5/2355 |
| | | | 348/296 |
| 2014/0078354 A1* | 3/2014 | Toyoguchi | H01L 27/14603 |
| | | | 348/246 |
| 2015/0208008 A1* | 7/2015 | Gendai | H04N 5/3698 |
| | | | 250/208.1 |
| 2015/0312506 A1* | 10/2015 | Okura | H04N 5/37457 |
| | | | 250/208.1 |
| 2015/0319388 A1* | 11/2015 | Ohshitanai | H04N 5/378 |
| | | | 348/301 |
| 2017/0332026 A1* | 11/2017 | Matsumoto | H04N 5/378 |

\* cited by examiner

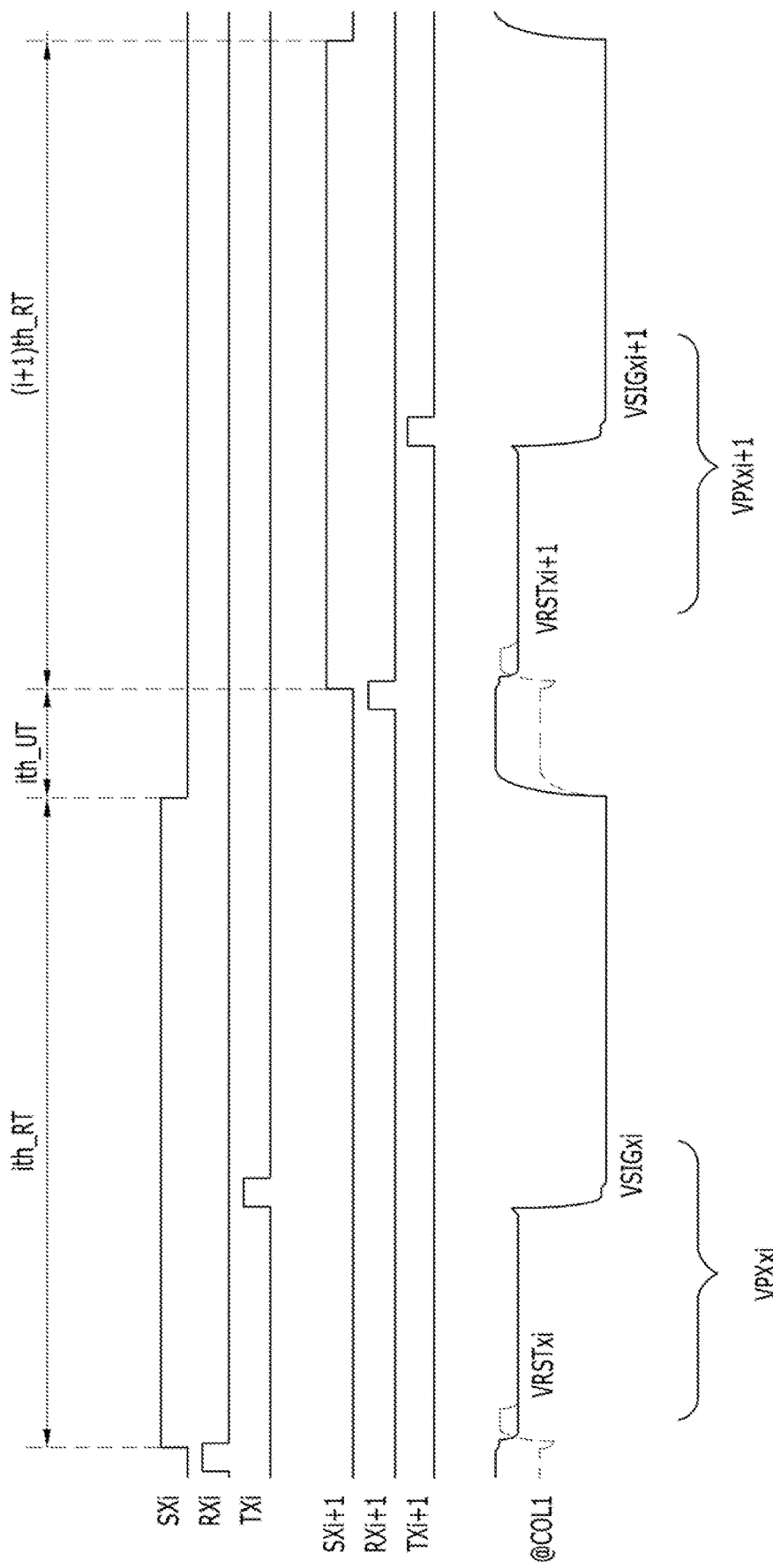

IMAGE SENSING DEVICE COMPRISING DUMMY PIXEL ROW AND ACTIVE PIXEL ROWS COUPLED TO READ-OUT COLUMN LINE, AND USING A HIGH SPEED ACTIVE PIXEL ROW READ-OUT METHOD THAT REDUCES SETTLING TIME BY PRECHARGING THE COLUMN LINE DURING A DUMMY PIXEL ROW SELECTION TIME BETWEEN ACTIVE PIXEL ROW SELECTION TIMES

CROSS-REFERENCE TO RELATED APPLICATIONS

The present application claims priority of Korean Patent Application No. 10-2015-0081057, filed on Jun. 9, 2015, which is incorporated herein by reference in its entirety.

BACKGROUND

1. Field

Exemplary embodiments of the present invention relate to a semiconductor design technology and, more particularly, to an image sensing device and a read-out method of the same.

2. Description of the Related Art

Image sensing devices capture images using the photosensitive properties of semiconductors. Image sensing devices may be classified into charge coupled device (CCD) image sensors and complementary metal oxide semiconductor (CMOS) image sensors. The CMOS image sensors have come into widespread use. This is because CMOS image sensors allow analog circuits and digital control circuits to be realized on a single integrated circuit (IC).

Meanwhile, image sensing devices adopt a column-parallel scheme in order to improve a read-out speed. In other words, image sensing devices read out a plurality of pixel signals by rows from a pixel array having a matrix structure, in which pixels are arranged in a row and a column direction. For example, image sensing device simultaneously read out pixel signals from pixels arranged in a first row during a first row selection time, and simultaneously read out pixel signals from pixels arranged in a second row during a second row selection time, and simultaneously read out pixel signals from pixels arranged in a last row during a last row selection time.

FIG. 1 is a timing diagram illustrating a read-out operation of an image sensing device according to a prior art. FIG. 1 illustrates a process for reading-out pixel signals through a single column line, i.e., a first column line COL1 and shows waveforms corresponding to two row selection times.

Referring to FIG. 1, the image sensing device reads out an $i^{th}$ pixel signal VPXxi from a pixel arranged in an $i^{th}$ row to the first column line COL1 during an $i^{th}$ row selection time ith_RT. To be specific, the image sensing device reads out an $i^{th}$ reset signal VRSTxi as the $i^{th}$ pixel signal VPXxi from the pixel arranged in the $i^{th}$ row through the first column line COL1 during an $i^{th}$ reset time of the $i^{th}$ row selection time ith_RT, and subsequently reads out an $i^{th}$ data signal VSIGxi as the $i^{th}$ pixel signal VPXxi from the pixel arranged from the $i^{th}$ row through the first column line COL1 during an $i^{th}$ data time of the $i^{th}$ row selection time ith_RT.

The $i^{th}$ row selection time ith_RT includes a time ranging from a moment when an $i^{th}$ selection control signal SXi is enabled until a moment when the $i^{th}$ selection control signal SXi is disabled. The $i^{th}$ reset time includes a time ranging from a moment when an $i^{th}$ reset control signal RXi is enabled until a moment when an $i^{th}$ transmission control signal TXi is enabled. The $i^{th}$ data time includes a time ranging from the moment when the $i^{th}$ transmission control signal TXi is enabled until the moment when the $i^{th}$ selection control signal SXi is disabled.

Then, the image sensing device reads out a $(i+1)^{th}$ pixel signal VPXxi+1 from the pixel arranged in a $(i+1)^{th}$ row to the first column line COL1 during a $(i+1)^{th}$ row selection time (i+1)th_RT. To be specific, the image sensing device reads out a $(i+1)^{th}$ reset signal VRSTxi+1 as the $(i+1)^{th}$ pixel signal VPXxi+1 from the pixel arranged in the $(i+1)^{th}$ row through the first column line COL1 during a $(i+1)^{th}$ reset time of the $(i+1)^{th}$ row selection time (i+1)th_RT, and subsequently reads out a $(i+1)^{th}$ data signal VSIGxi+1 as the $(i+1)^{th}$ pixel signal VPXxi+1 from the pixel arranged in the $(i+1)^{th}$ row through the first column line COL1 during a $(i+1)^{th}$ data time of the $(i+1)^{th}$ row selection time (i+1)th_RT.

The $(i+1)^{th}$ row selection time (i+1)th_RT includes a time ranging from a moment when a $(i+1)^{th}$ selection control signal SXi+1 is enabled until a moment when the $(i+1)^{th}$ selection control signal SXi+1 is disabled. The $(i+1)^{th}$ reset time includes a time ranging from a moment when a $(i+1)^{th}$ reset control signal RXi+1 is enabled until a moment when a $(i+1)^{th}$ transmission control signal TXi+1 is enabled. The $(i+1)^{th}$ data time includes a time ranging from the moment when the $(i+1)^{th}$ transmission control signal TXi+1 is enabled until the moment when the $(i+1)^{th}$ selection control signal SXi+1 is disabled.

During the read-out operation of the image sensing device, there is an $i^{th}$ row non-selection time ith_UT between the $i^{th}$ row selection time ith_RT and the $(i+1)^{th}$ row selection time (i+1)th_RT. The first column line COL1 becomes gradually lower to a low voltage level, e.g., VSSPX, during the $i^{th}$ row non-selection time ith_UT. This is because the pixel arranged in the $i^{th}$ row and the first column line COL1 are electrically disconnected, and just a current source is coupled to the first column line COL1.

When the $i^{th}$ row non-selection time ith_UT is terminated, and the $(i+1)^{th}$ row selection time (i+1)th_RT starts, the image sensing device starts to read out the $(i+1)^{th}$ reset signal VRSTxi+1 to the first column line COL1. There is a settling time required for the voltage level of the first column line COL1 to rise from the low voltage level, e.g., VSSPX, to a target level of the $(i+1)^{th}$ reset signal VRSTxi+1. The settling time is a factor increasing the $(i+1)^{th}$ row selection time (i+1)th_RT. The settling time causes increase of all row selection time as well as the $(i+1)^{th}$ row selection time (i+1)th_RT, and consequently slows down a read-out speed of the image sensing device. Since the settling time increases (shown with a dotted line in FIG. 1) as resolution becomes higher, a technology for reducing the setting time is required.

SUMMARY

Exemplary embodiments of the present invention are directed to an image sensing device capable of minimizing a settling time, and a read-out method of the image sensing device.

In accordance with an embodiment of the present invention, an image sensing device includes: a pixel suitable for outputting a pixel signal through a read-out line during a read-out section; and a precharge block suitable for precharging the read-out line to a voltage level corresponding to an initial voltage level of the pixel signal during a row non-selection section adjacent to the read-out section.

The initial voltage level may correspond to a voltage level of a reset signal included in the pixel signal.

The read-out section may be subsequent to the row non-selection section.

The precharge block may include a replica circuit that replicates the pixel.

In accordance with another embodiment of the present invention, an image sensing device includes: an active pixel coupled to a column line, and suitable for outputting a pixel signal through a column line during a read-out section; and a dummy pixel coupled to the column line, and suitable for precharging the column line to a voltage level corresponding to an initial voltage level of the pixel signal during a row non-selection section adjacent to the read-out section.

The read-out section may be subsequent to the row non-selection section.

The active pixel may include: a photo diode; a first coupling block suitable for coupling the photo diode to a diffusion node in response to a first control signal; a second coupling block suitable for coupling the diffusion node to a high voltage node in response to a second control signal; a third coupling block suitable for coupling the high voltage node to a selection node based on a voltage level charged in the diffusion node; and a fourth coupling block suitable for coupling the selection node to the column line in response to a third control signal.

The second control signal may be enabled ahead of the third control signal.

An enabling section of the second control signal and an enabling section of the third control signal may partially overlap each other.

The dummy pixel may include: a dummy photo diode; a first dummy coupling block suitable for coupling the dummy photo diode to a dummy floating diffusion node in response to a first dummy control signal; a second dummy coupling block suitable for coupling the dummy floating diffusion node to the high voltage node in response to a second dummy control signal; a third dummy coupling block suitable for coupling the high voltage node to a dummy selection node based on a voltage level charged in the dummy floating diffusion node; and a fourth dummy coupling block suitable for coupling the dummy selection node to the column line in response to a third dummy control signal.

The first dummy control signal may include a signal fixed with a first voltage level, and the second dummy control signal may include a signal fixed with a second voltage level.

The first voltage level may correspond to a low voltage level, and the second voltage level may correspond to a high voltage level.

The third dummy control signal may be enabled during the row non-selection section.

In accordance with another embodiment of the present invention, a read-out method of an image sending device includes: precharging a column line to a voltage level corresponding to a reset level of a pixel signal during a row non-selection section; charging a floating diffusion node with a predetermined voltage in advance during the row non-selection section; and reading out the pixel signal corresponding to a voltage level charged in the floating diffusion node through the column line during a row selection section subsequent to the row non-selection section.

The precharging of the column line may include: charging a dummy floating diffusion node with the predetermined voltage; and precharging the column line to the reset level of the pixel signal corresponding to a voltage level charged in the dummy floating diffusion node.

The charging of the floating diffusion node may be carried out from a latter portion of the row non-selection section until an initial portion of the row selection section.

BRIEF DESCRIPTION OF THE DRAWINGS

FIG. 6 is a timing diagram for illustrating a read-out operation of the image sensing device shown in FIG. 4.

DETAILED DESCRIPTION

Exemplary embodiments of the present invention are described below in more detail with reference to the accompanying drawings. These embodiments are provided so that this disclosure is thorough and complete, and fully convey the scope of the present invention to those skilled in the art. All "embodiments" referred to in this disclosure refer to embodiments of the inventive concept disclosed herein. The embodiments presented are merely examples and are not intended to limit the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of one or more of the associated listed items.

Figure 1:
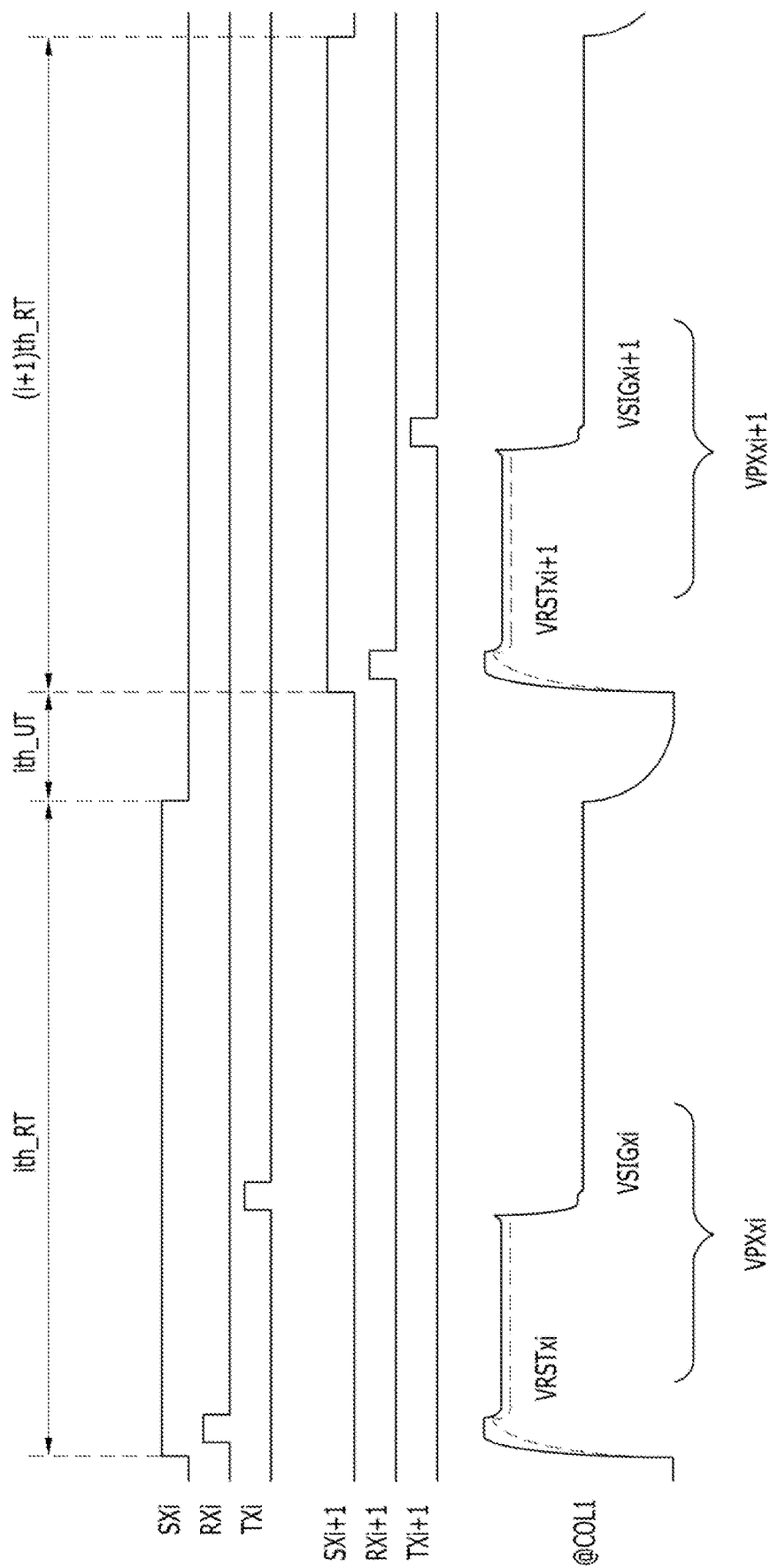
FIG. 1 is a timing diagram illustrating a read-out operation of an image sensing device according to a prior art.
Figure 2:
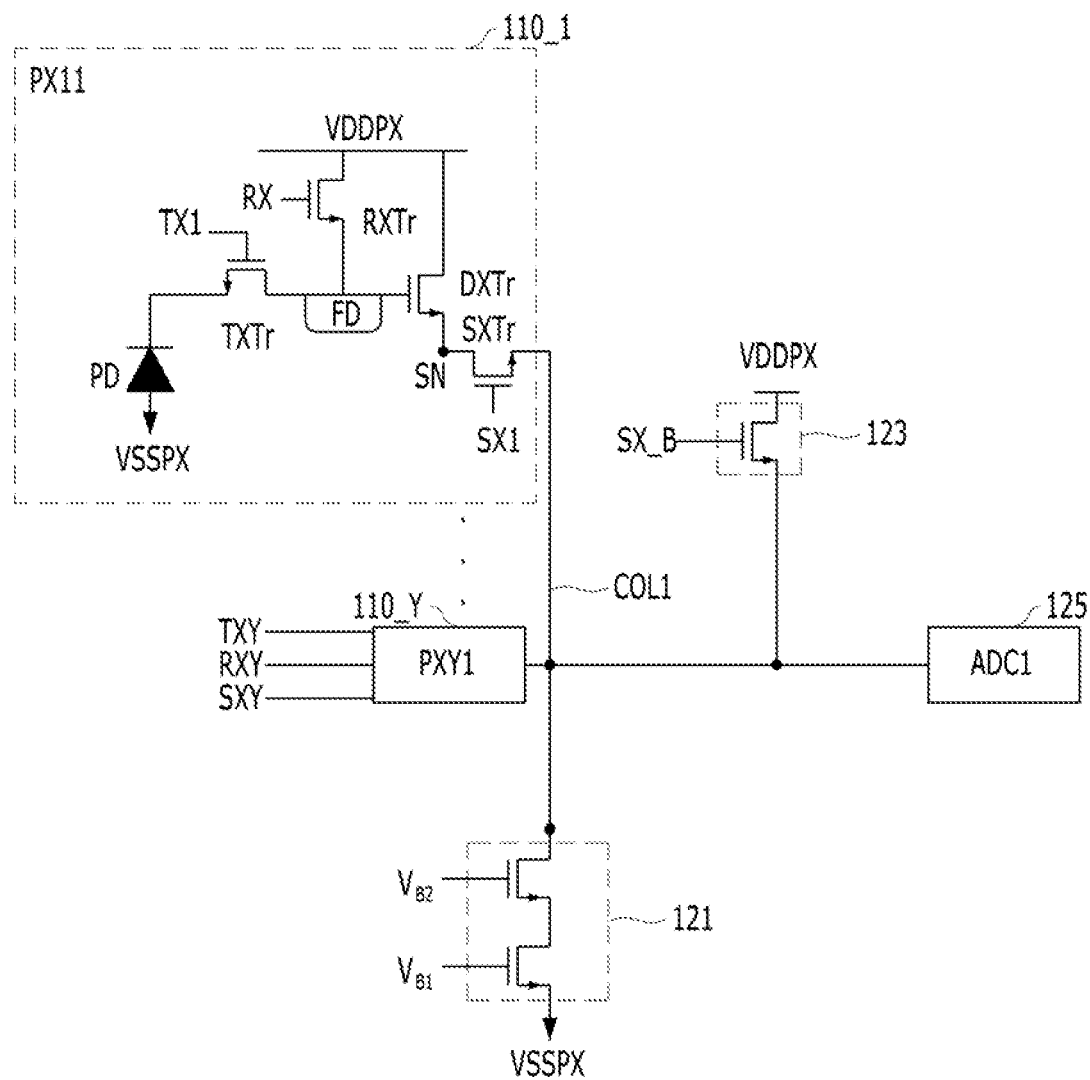
FIG. 2 is a circuit diagram illustrating an image sensing device according to a comparative example of the present invention.

FIG. 2 is a circuit diagram illustrating an image sensing device according to a comparative example of the present invention. For the sake of convenience in description, FIG. 2 shows a structure corresponding to a single column path.

Referring to FIG. 2, an image sensing device 100 includes a plurality of pixels 110_1 to 110_Y, a current source 121, a precharge block 123, and an analog-to-digital converter 125.

The pixels 110_1 to 110_Y are coupled to a first column line COL1 in parallel and sequentially output a plurality of pixel signals to the first column line COL1 in response to operation control signals TXi, RXi and SXi.

The operation control signals TXi, RXi and SXi are assigned by rows. For example, first operation control signals TX1, RX1 and SX1 are commonly inputted to the pixels arranged in a first row, and second operation control signals TX2, RX2 and SX2 are commonly inputted to the pixels arranged in a second row, and $Y^{th}$ operation control signals TXY, RXY and SXY are commonly inputted to the pixels arranged in a $Y^{th}$ row.

The pixels 110_1 to 110_Y sequentially output reset signals and data signals as the pixel signals to the first column line COL1 during each assigned row selection time in response to the operation control signals TXi, RXi and SXi. For example, the first pixel 110_1 sequentially outputs a first reset signal and a first data signal as a first pixel signal to the first column line COL1 during a first row selection time in response to the first operation control signals TX1, RX1 and SX1, and the second pixel 110_2 sequentially outputs a second reset signal and a second data signal as a second pixel signal to the first column line COL1 during a second row selection time in response to the second operation control signals TX2, RX2 and SX2 (not shown), and the $Y^{th}$ pixel 110_Y sequentially outputs a $Y^{th}$ reset signal and a $Y^{th}$ data signal as a $Y^{th}$ pixel signal to the first column line COL1 during a $Y^{th}$ row selection time in response to the $Y^{th}$ operation control signals TXY, RXY and SXY. Since the pixels 110_1 to 110_Y have the same structure, the first pixel 110_1 is representatively described below.

The first pixel 110_1 includes a photo diode PD, a first coupling unit TXTr, a second coupling unit RXTr, a third coupling unit DXTr, and a fourth coupling unit SXTr. The first coupling unit TXTr selectively couples the photo diode PD to a floating diffusion node FD in response to a first transmission control signal TX1 among the first operation control signals TX1, RX1 and SX1. The second coupling unit RXTr selectively couples the floating diffusion node FD to a high voltage node VDDPX in response to a first reset control signal RX1 among the first operation control signals TX1, RX1 and SX1. The third coupling unit DXTr selectively couples the high voltage node VDDPX to a selection node SN based on a voltage level charged in the floating diffusion node FD. The fourth coupling unit SXTr selectively couples the selection node SN to the first column line COL1 in response to a first selection control signal SX1 among the first operation control signals TX1, RX1 and SX1. While the first pixel 110_1 having the aforementioned structure is electrically coupled to the first column line COL1 in response to the first selection control signal SX1, the first pixel 110_1 outputs the first reset signal corresponding to a voltage charged in the floating diffusion node FD as the first pixel signal to the first column line COL1 in response to the first reset control signal RX1, and subsequently outputs the first data signal corresponding to the voltage charged in the floating diffusion node FD as the first pixel signal to the first column line COL1 in response to the first transmission control signal TX1.

The current source 121 forms a source follower together with the pixels 110_1 to 110_Y and serves as a tail current source of the source follower.

The precharge block 123 precharges the first column line COL1 with the high voltage VDDPX every row non-selection time between the row selection times in response to a precharge signal SX_B. The precharge signal SX_B includes inverted signals of signals obtained by performing an OR operation on the first to $Y^{th}$ selection control signals SX1 to SXY.

The analog-to-digital converter 125 converts the pixel signals that are sequentially read out through the first column line COL1 into digital signals.

Hereafter, an operation of the image sensing device 100 is described with reference to FIG. 3.

Figure 3:
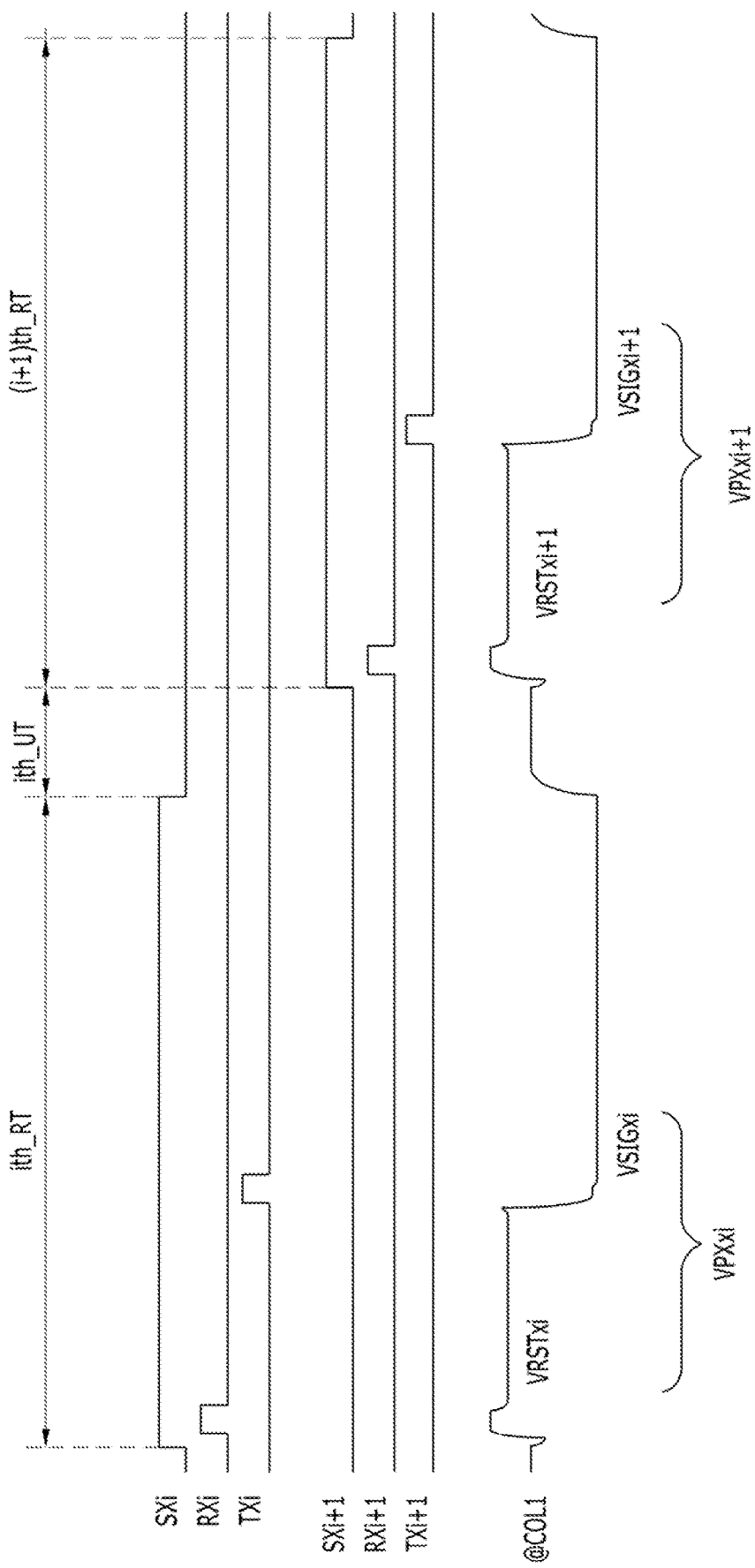
FIG. 3 is a timing diagram illustrating a read-out operation of the image sensing device shown in FIG. 2.

FIG. 3 is a timing diagram illustrating a read-out operation of the image sensing device 100 shown in FIG. 2. For the sake of convenience in description, FIG. 3 illustrates a process for reading-out the pixel signals through the first column line COL1 and shows waveforms corresponding to two row selection times.

Referring to FIG. 3, the image sensing device 100 reads out an $i^{th}$ pixel signal VPXxi from the $i^{th}$ pixel 110_i arranged in an $i^{th}$ row to the first column line COL1 during an $i^{th}$ row selection time ith_RT. To be specific, the $i^{th}$ pixel 110_i arranged in the $i^{th}$ row outputs an $i^{th}$ reset signal VRSTxi as the $i^{th}$ pixel signal VPXxi to the first column line COL1 in response to an $i^{th}$ reset control signal RXi during an $i^{th}$ reset time of the $i^{th}$ row selection time ith_RT, and subsequently outputs an $i^{th}$ data signal VSIGxi as the $i^{th}$ pixel signal VPXxi to the first column line COL1 in response to an $i^{th}$ transmission control signal TXi during an ii data time of the $i^{th}$ row selection time ith_RT.

The $i^{th}$ row selection time ith_RT includes a time ranging from a moment when an $i^{th}$ selection control signal SXi is enabled until a moment when the $i^{th}$ selection control signal SXi is disabled. The $i^{th}$ reset time includes a time ranging from a moment when the $i^{th}$ reset control signal RXi is enabled until a moment when the $i^{th}$ transmission control signal TXi is enabled. The $i^{th}$ data time includes a time ranging from the moment when the $i^{th}$ transmission control signal TXi is enabled until the moment when the $i^{th}$ selection control signal SXi is disabled.

Then, the image sensing device 100 precharges the first column line COL1 with the high voltage VDDPX while the $i^{th}$ pixel 110_i is electrically disconnected during an $i^{th}$ row non-selection time ith_UT. In other words, the precharge block 123 precharges the first column line COL1 with the high voltage VDDPX during the $i^{th}$ row non-selection time ith_UT in response to the precharge signal SX_B.

Subsequently, the image sensing device 100 reads out a $(i+1)^{th}$ pixel signal VPXxi+1 from a $(i+1)^{th}$ pixel 110_i+1 arranged in a $(i+1)^{th}$ row to the first column line COL1 during a $(i+1)^{th}$ row selection time (i+1)th_RT. To be specific, the $(i+1)^{th}$ pixel 110_i+1 arranged in the $(i+1)^{th}$ row outputs a $(i+1)^{th}$ reset signal VRSTxi+1 as the $(i+1)^{th}$ pixel signal VPXxi+1 to the first column line COL1 in response to a $(i+1)^{th}$ reset control signal RXi+1 during a $(i+1)^{th}$ reset time of the $(i+1)^{th}$ row selection time (i+1)th_RT, and subsequently outputs a $(i+1)^{th}$ data signal VSIGxi+1 as the $(i+1)^{th}$ pixel signal VPXxi+1 to the first column line COL1 in response to a $(i+1)^{th}$ transmission control signal TXi+1 during a $(i+1)^{th}$ data time of the $(i+1)^{th}$ row selection time (i+1)th_RT.

The $(i+1)^{th}$ row selection time (i+1)th_RT includes a time ranging from a moment when a $(i+1)^{th}$ selection control signal SXi+1 is enabled until a moment when the $(i+1)^{th}$ selection control signal SXi+1 is disabled. The $(i+1)^{th}$ reset time includes a time ranging from a moment when the $(i+1)^{th}$ reset control signal RXi+1 is enabled until a moment when the $(i+1)^{th}$ transmission control signal TXi+1 is enabled. The $(i+1)^{th}$ data time includes a time ranging from the moment when the $(i+1)^{th}$ transmission control signal TXi+1 is enabled until the moment when the $(i+1)^{th}$ selection control signal SXi+1 is disabled.

Although not illustrated, the image sensing device 100 precharges the first column line COL1 with the high voltage VDDPX while the $(i+1)^{th}$ pixel 110_i+1 is electrically disconnected during the $i^{th}$ row non-selection time ith_UT. In other words, the precharge block 123 precharges the first column line COL1 with the high voltage VDDPX during the $i^{th}$ row non-selection time ith_UT in response to the precharge signal SX_B.

According to the comparative example, the image sensing device 100 has an advantage of reducing a settling time of the reset signal, e.g., VRSTxi+1, that is read out during a next row selection time, e.g., (i+1)th_RT, by precharging a column line, e.g., COL1, with the high voltage VDDPX during the row non-selection time, e.g., ith_UT.

However, the following issue may occur in the image sensing device 100 according to the comparative example and is described below using the $(i+1)^{th}$ pixel 110_$i$+1 for example.

The $(i+1)^{th}$ reset signal VRSTxi+1 that is read out from the $(i+1)^{th}$ pixel 110_$i$+1 is substantially generated from the third coupling unit DXTri+1 included in the $(i+1)^{th}$ pixel 110_$i$+1, and the first column line COL1 is precharged by the precharge block 123. The third coupling unit DXTri+1 and the precharge block 123 are formed of NMOS transistors that source the high voltage VDDPX. A threshold voltage of the NMOS transistor corresponding to the third coupling unit DXTri+1 and a threshold voltage of the NMOS transistor corresponding to the precharge block 123 are different from each other. For example, the threshold voltage of the NMOS transistor corresponding to the precharge block 123 is higher than the threshold voltage of the NMOS transistor corresponding to the third coupling unit DXTri+1. This is because a transistor included in a pixel and a transistor included in a circuit other than the pixel are fabricated through different processes. Even though the threshold voltages are designed similarly to each other, a peripheral circuit circumstance or condition of the third coupling unit DXTri+1 that generates the $(i+1)^{th}$ reset signal VRSTxi+1 and a peripheral circuit circumstance or condition of the precharge block 123 are different from each other.

Due to the aforementioned reason, the precharge block 123 may not precharge the first column line COL1 to a voltage level which is similar to the $(i+1)^{th}$ reset signal VRSTxi+1. Therefore, there is limitation in reducing the settling time of the $(i+1)^{th}$ reset signal VRSTxi+1.

Accordingly, an image sensing device capable of precharging a column line to a voltage level similar to a reset signal during a row non-selection time is provided in an embodiment of the present invention.

Figure 4:
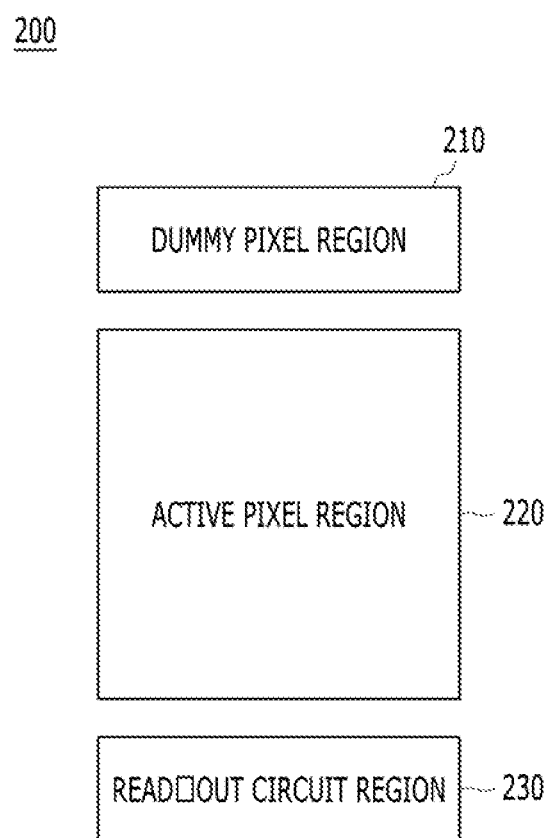
FIG. 4 is a block diagram illustrating an image sensing device in accordance with an embodiment of the present invention.

FIG. 4 is a block diagram illustrating an image sensing device in accordance with an embodiment of the present invention.

Referring to FIG. 4, an image sensing device 200 may include a dummy pixel region 210, an active pixel region 220 and a read-out circuit region 230.

The dummy pixel region 210 may include a plurality of dummy pixels. For example, the dummy pixel region 210 may include first to $X^{th}$ dummy pixels arranged in a single row. The first to $X^{th}$ dummy pixels may be coupled to first to $X^{th}$ column lines that are coupled to the active pixel region 220, respectively. The dummy pixel region 210 having the aforementioned structure may precharge the first to $X^{th}$ column lines to a voltage level corresponding to an initial voltage level or a reset level of a pixel signal every row non-selection section. In other words, the dummy pixel region 210 may precharge the first to $X^{th}$ column lines to a level similar to the reset signal of the pixel signal.

The active pixel region 220 may include X*Y pixels arranged in first to $Y^{th}$ rows and first to $X^{th}$ columns. The active pixel region 220 may sequentially output pixel signals by rows. For example, the active pixel region 220 may simultaneously output first to $X^{th}$ pixel signals from first to $X^{th}$ pixels arranged in the first row to the first to $X^{th}$ column lines during a first row selection time, and may simultaneously output the first to $X^{th}$ pixel signals from the first to $X^{th}$ pixels arranged in the second row to the first to $X^{th}$ column lines during a second row selection time, and may simultaneously output the first to $X^{th}$ pixel signals from the first to $X^{th}$ pixels arranged in the $Y^{th}$ row to the first to $X^{th}$ column lines during a $Y^{th}$ row selection time.

Each of the pixel signals may include a reset signal and a data signal. The reset signal may be read out as the pixel signal, and subsequently the data signal may be read out as the pixel signal.

The read-out circuit region 230 may convert the first to $X^{th}$ pixel signals that are read out through the first to $X^{th}$ column lines into digital signals.

Figure 5:
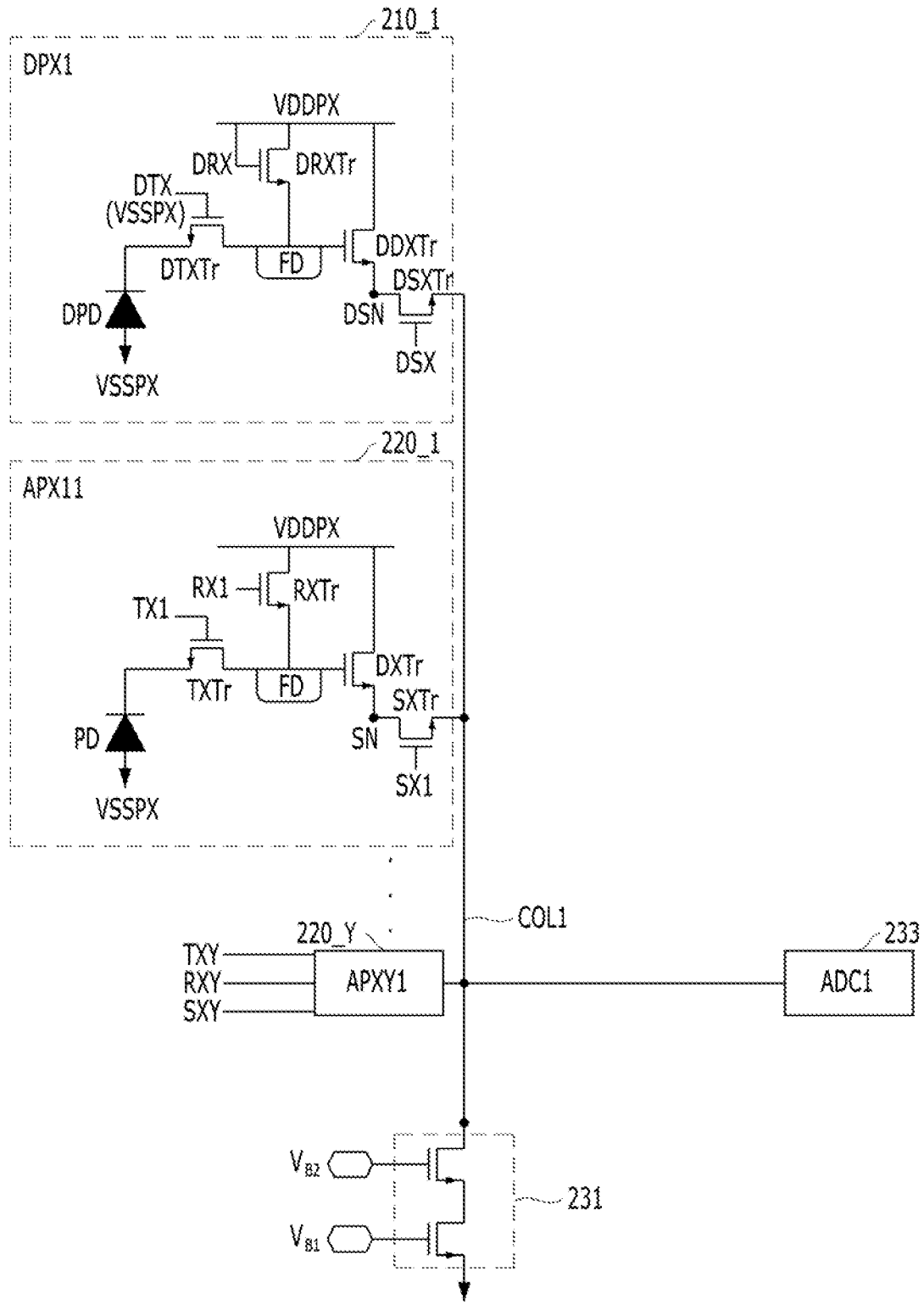
FIG. 5 is a circuit diagram illustrating a single column path of the image sensing device shown in FIG. 4.

FIG. 5 is a circuit diagram illustrating the dummy pixel region 210, the active pixel region 220 and the read-out circuit region 230 shown in FIG. 4. For the sake of convenience in description, FIG. 5 shows a structure corresponding to a first column path among first to $X^{th}$ column paths.

Referring to FIG. 5, the dummy pixel region 210 may include a first dummy pixel 210_1 corresponding to the first column path. The first dummy pixel 210_1 may be coupled to a first column line COL1. The first dummy pixel 210_1 may serve as a precharge block for precharging the first column line COL1 to a voltage level similar to the reset signal every row non-selection section. To this end, the first dummy pixel 210_1 may be designed to have the same structure as first to $Y^{th}$ active pixels 220_1 to 220_Y, which are to be described below.

For example, the first dummy pixel 210_1 may include a dummy photo diode DPD, a first dummy coupling block DTXTr, a second dummy coupling block DRXTr, a third dummy coupling block DDXTr, and a fourth dummy coupling block DSXTr. The first dummy coupling block DTXTr may couple the dummy photo diode DPD to a dummy floating diffusion node DFD in response to a dummy transmission control signal DTX. For example, the dummy transmission control signal DTX may be fixed with a low voltage level VSSPX. Therefore, the first dummy coupling block DTXTr may continuously maintain a turn-off state. The second dummy coupling block DRXTr may couple the dummy floating diffusion node DFD to a high voltage node VDDPX in response to a dummy reset control signal DRX. For example, the dummy reset control signal DRX may be fixed with a high voltage level VDDPX. Therefore, the second dummy coupling block DRXTr may continuously maintain a turn-on state. The third dummy coupling block DDXTr may couple the high voltage node VDDPX to a dummy selection node DSN based on a voltage level charged in the dummy floating diffusion node DFD. The fourth dummy coupling block DSXTr may couple the dummy selection node DSN to the first column line COL1 in response to a dummy selection control signal DSX. For example, the dummy selection control signal DSX may be an inverted signal of a signal obtained by performing an OR operation on first to $Y^{th}$ selection control signals SX1 to SXY, which are to be described below.

The active pixel region 220 may include the first to $Y^{th}$ active pixels 220_1 to 220_Y corresponding to the first column path. The first to $Y^{th}$ active pixels 220_1 to 220_Y refer to as first active pixels arranged in first to $Y^{th}$ rows. The first to $Y^{th}$ active pixels 220_1 to 220_Y may have the same structure as the first to $Y^{th}$ pixels 110_1 to 110_Y shown in the comparative example as described above. The first to $Y^{th}$ active pixels 220_1 to 220_Y may be coupled to the first column line COL1 in parallel. The first to $Y^{th}$ active pixels 220_1 to 220_Y may sequentially output first to $Y^{th}$ pixel signals to the first column line COL1. The first to $Y^{th}$ pixel signals may include first to $Y^{th}$ reset signals and first to $Y^{th}$ data signals. Since the first to $Y^{th}$ active pixels 220_1 to 220_Y have the same structure, the first active pixel 220_1 is representatively described hereafter.

For example, the first active pixel 220_1 may include a photo diode PD, a first coupling block TXTr, a second coupling block RXTr, a third coupling block DXTr, and a fourth coupling block SXTr. The first coupling block TXTr may couple the photo diode PD to a floating diffusion node FD in response to a first transmission control signal TX1. The second coupling block RXTr may couple the floating diffusion node FD to a high voltage node VDDPX in response to a first reset control signal RX1. The third coupling block DXTr may couple the high voltage node VDDPX to a selection node SN based on a voltage level charged in the floating diffusion node FD. The fourth coupling block SXTr may couple the selection node SN to the first column line COL1 in response to a first selection control signal SX1.

The read-out circuit region 230 may include a first current source 231 corresponding to the first column path, and a first analog-to-digital converter 233.

The first current source 231 may be coupled to the first column line COL1. The first current source 231 may form a source follower together with one among the first to $Y^{th}$ active pixels 220_1 to 220_Y every row selection time and form the source follower together with the first dummy pixel 210_1 every row non-selection time. The first current source 231 may serve as a tail current source of the source follower.

The first analog-to-digital converter 233 may convert the first to $Y^{th}$ pixel signals that are sequentially read out through the first column line COL1 into digital signals.

Hereafter, an operation of the image sensing device 200 having the aforementioned structure is described with reference to FIG. 6.

FIG. 6 is a timing diagram for illustrating a read-out operation of the image sensing device 200 shown in FIG. 4. FIG. 6 illustrates a process for reading-out the pixel signals through the first column line COL1 and shows waveforms corresponding to two row selection times.

Referring to FIG. 6, the image sensing device 200 may read out an $i^{th}$ pixel signal VPXxi from an $i^{th}$ active pixel 220_i arranged in an $i^{th}$ row to the first column line COL1 during an $i^{th}$ row selection time ith_RT. To be specific, the $i^{th}$ pixel 220_i may output an $i^{th}$ reset signal VRSTxi as the $i^{th}$ pixel signal VPXxi to the first column line COL1 in response to an $i^{th}$ reset control signal RXi and an $i^{th}$ selection control signal SXi during an $i^{th}$ reset time of the $i^{th}$ row selection time ith_RT, and subsequently output an $i^{th}$ data signal VSIGxi as the $i^{th}$ pixel signal VPXxi to the first column line COL1 in response to an $i^{th}$ transmission control signal TXi during an $i^{th}$ data time of the $i^{th}$ row selection time ith_RT.

The $i^{th}$ reset control signal RXi may be enabled ahead of the $i^{th}$ selection control signal SXi. The $i^{th}$ reset control signal RXi may be disabled after the $i^{th}$ selection control signal SXi is enabled. In other words, the enabling section of the $i^{th}$ reset control signal RXi may partially overlap the enabling section of the $i^{th}$ selection control signal SXi. The overlapping section is described below in detail.

The $i^{th}$ row selection time ith_RT may include a time ranging from a moment when the $i^{th}$ selection control signal SXi is enabled until a moment when the $i^{th}$ selection control signal SXi is disabled. The $i^{th}$ reset time may include a time ranging from a moment when the $i^{th}$ selection control signal SXi is enabled until a moment when the $i^{th}$ transmission control signal TXi is enabled. The $i^{th}$ data time may include a time ranging from the moment when the $i^{th}$ transmission control signal TXi is enabled until the moment when the $i^{th}$ selection control signal SXi is disabled.

The image sensing device 200 may precharge the first column line COL1 with the high voltage VDDPX while the $i^{th}$ pixel 220_i is electrically disconnected during an $i^{th}$ row non-selection time ith_UT. In other words, the first dummy pixel 210_1 may precharge the first column line COL1 with the high voltage VDDPX during the $i^{th}$ row non-selection time ith_UT in response to a first dummy control signal DSX1. Particularly, since the first dummy pixel 210_1 has the same structure as the first to $Y^{th}$ active pixels 220_1 to 220_Y, the first dummy pixel 210_1 may precharge the first column line COL1 to a voltage level similar to a $(i+1)^{th}$ reset signal VRSTxi+1 that is read out from a $(i+1)^{th}$ active pixel 220_i+1, which is to be described below.

Subsequently, the image sensing device 200 may read out a $(i+1)^{th}$ pixel signal VPXxi+1 from the $(i+1)^{th}$ active pixel 220_i+1 arranged in a $(i+1)^{th}$ row to the first column line COL1 during a $(i+1)^{th}$ row selection time (i+1)th_RT. To be specific, the $(i+1)^{th}$ active pixel 220_i+1 may output a $(i+1)^{th}$ reset signal VRSTxi+1 as the $(i+1)^{th}$ pixel signal VPXxi+1 to the first column line COL1 in response to a $(i+1)^{th}$ reset control signal RXi+1 during a $(i+1)^{th}$ reset time of the $(i+1)^{th}$ row selection time (i+1)th_RT, and subsequently output a $(i+1)^{th}$ data signal VSIGxi+1 as the $(i+1)^{th}$ pixel signal VPXxi+1 to the first column line COL1 in response to a $(i+1)^{th}$ transmission control signal TXi+1 during a $(i+1)^{th}$ data time of the $(i+1)^{th}$ row selection time (i+1)th_RT.

The $(i+1)^{th}$ reset control signal RXi+1 may be enabled ahead of the $(i+1)^{th}$ selection control signal SXi+1. The $(i+1)^{th}$ reset control signal RXi+1 may be disabled after the $(i+1)^{th}$ selection control signal SXi+1 is enabled. In other words, a portion of the enabling section of the $(i+1)^{th}$ reset control signal RXi+1 may overlap a latter portion of the enabling section of the dummy selection control signal DSX, and the other portion of the enabling section of the $(i+1)^{th}$ reset control signal RXi+1 may overlap an initial portion of an enabling section of the $(i+1)^{th}$ selection control signal SXi+1. This is because the first column line COL1 is precharged to a voltage level corresponding to the $(i+1)^{th}$ reset signal VRSTxi+1 during the $i^{th}$ row non-selection time ith_UT and thus a settling time of the $(i+1)^{th}$ reset signal VRSTxi+1 is not necessary during the $(i+1)^{th}$ reset time. The above-described timing operation may allow the first column line COL1 to maintain the voltage level corresponding to the $(i+1)^{th}$ reset signal VRSTxi+1 at a moment when the $i^{th}$ row non-selection time ith_UT is terminated or at a moment when the $(i+1)^{th}$ row selection time (i+1)th_RT starts.

The $(i+1)^{th}$ row selection time (i+1)th_RT may include a time ranging from a moment when the $(i+1)^{th}$ selection control signal SXi+1 is enabled until a moment when the $(i+1)^{th}$ selection control signal SXi+1 is disabled. The $(i+1)^{th}$ reset time may include a time ranging from a moment when the $(i+1)^{th}$ selection control signal SXi+1 is enabled until a moment when the $(i+1)^{th}$ transmission control signal TXi+1 is enabled. The $(i+1)^{th}$ data time may include a time ranging from the moment when the $(i+1)^{th}$ transmission control signal TXi+1 is enabled until the moment when the $(i+1)^{th}$ selection control signal SXi+1 is disabled.

Although not illustrated, the image sensing device 200 may precharge the first column line COL1 with the high voltage VDDPX while the $(i+1)^{th}$ pixel 220_i+1 is electrically disconnected during the $(i+1)^{th}$ row non-selection time (i+1)th_UT. Particularly, although the first dummy pixel 210_1 is not shown in the drawing, the first dummy pixel 210_1 may precharge the first column line COL1 to a voltage level similar to a $(i+2)^{th}$ reset signal VRSTxi+2 that is read out from a $(i+2)^{th}$ active pixel 220_i+2 in response to the first dummy control signal DSX1.

In accordance with the embodiment of the present invention, the image sensing device has an advantage of advancing an enabling section of a reset control signal since a settling time of a reset signal is not necessary.

In accordance with the embodiment of the present invention, a high-speed read-out operation may be performed since read-out operation timing may be advanced as a settling time of a reset signal that is read out to a column line is minimized.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

For example, although it is described in the embodiment of the present invention that a dummy pixel region is formed in the upper portion of an active pixel region in the drawing, the inventive concept is not limited to this, and the dummy pixel region may be formed in the middle or the lower portion of the active pixel region.

Also, although it is described in the embodiment of the present invention that a dummy pixel serves as a precharge block, and the inventive concept is not limited to this, and a replica circuit that replicates an active pixel may serve as the precharge block.

What is claimed is:

1. A read-out method of an image sending device, comprising:
    reading out a first pixel signal corresponding to a voltage level charged in a floating diffusion node of a first active pixel through a column line during a first row selection section;
    precharging, by using a dummy pixel, a column line to a voltage level corresponding to a reset level of pixel signals during a dummy row selection section;
    charging a floating diffusion node of a second active pixel with a predetermined voltage in advance during the dummy row selection section; and
    reading out a second pixel signal corresponding to a voltage level charged in a floating diffusion node of the second active pixel through the column line during a second row selection section,
    wherein the precharging of the column line includes:
    charging a dummy floating diffusion node of the dummy pixel with the predetermined voltage; and
    precharging the column line to the reset level of the pixel signals corresponding to a voltage level charged in the dummy floating diffusion node, and
    wherein the charging of the dummy floating diffusion node of the dummy pixel is carried out from a latter portion of the dummy row selection section until an initial portion of the second row selection section.

2. A read-out method of an image sending device, comprising:
    reading out a first pixel signal of a first active pixel of a plurality of active pixels coupled to a first row and a column line, through the column line during a first row selection time,
    wherein the first row selection time includes a time from when a first selection control signal is enabled until the first selection control signal is disabled;
    precharging the column line to a voltage level corresponding to a voltage level of a reset signal which is read out from the first active pixel, by using a dummy pixel having a same structure as an active pixel of the plurality of active pixels and which is coupled to the column line, while the first active pixel and a second active pixel are electrically disconnected during a section between the first row selection time and a second row selection time;
    enabling a reset control signal ahead of a second selection control signal for a second active pixel such that a portion of an enabling section of the reset control signal overlaps a latter portion of an enabling section of a dummy selection control signal, and another portion of an enabling section of the reset control signal overlaps an initial portion of an enabling section of the second selection control signal; and
    reading out a second pixel signal of the second active pixel coupled to a second row and the column line during the second row selection time, through the column line which is precharged to the voltage level of the reset signal which is read out from the first active pixel,
    wherein the second row selection time includes a time from when the second selection control signal is enabled until the second selection control signal is disabled.

* * * * *